(12) United States Patent  
Natsumeda et al.

(10) Patent No.: US 9,039,201 B2  
(45) Date of Patent: *May 26, 2015

(54) DISPLAY ELEMENT, DISPLAY DEVICE, AND PROJECTION DISPLAY DEVICE

(75) Inventors: Masanao Natsumeda, Tokyo (JP); Masao Imai, Tokyo (JP); Goroh Saitoh, Tokyo (JP); Shin Tominaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 191 days.
This patent is subject to a terminal disclaimer.

(21) Appl. No.: 13/640,583

(22) PCT Filed: May 13, 2011

(86) PCT No.: PCT/JP2011/061045
§ 371 (c)(1),
(2), (4) Date: Oct. 11, 2012

(87) PCT Pub. No.: WO2011/142455
PCT Pub. Date: Nov. 17, 2011

(65) Prior Publication Data
US 2013/0027675 A1    Jan. 31, 2013

(30) Foreign Application Priority Data

May 14, 2010   (JP) .................................. 2010-112073

(51) Int. Cl.
*G02F 1/13357*   (2006.01)
*G03B 21/14*   (2006.01)
(Continued)

(52) U.S. Cl.
CPC ................ *G03B 21/00* (2013.01); *G02B 5/008*
(2013.01); *G02B 6/0038* (2013.01); *G02B 6/005* (2013.01);
(Continued)

(58) Field of Classification Search
USPC ......... 313/498–509, 117; 353/88; 349/32, 62, 349/1, 5, 7, 8
See application file for complete search history.

(56) References Cited

U.S. PATENT DOCUMENTS

2004/0206969 A1   10/2004  Orita
2006/0187528 A1   8/2006   Hagood et al.
(Continued)

FOREIGN PATENT DOCUMENTS

CN         1538537 A       10/2004
CN       101371177 A       2/2009
(Continued)

OTHER PUBLICATIONS

Ehren Hwang et al., "Surface Plasmon Polariton Enhanced Fluorescence from Quantum Dots on Nanostructured Metal Surfaces" Nano Letters, Mar. 10, 2010, pp. 813-820, vol. 10, No. 3.
(Continued)

*Primary Examiner* — William C Dowling
(74) *Attorney, Agent, or Firm* — Sughrue Mion, PLLC

(57) ABSTRACT

The present invention includes light valve section (10) having a plurality of shutter mechanisms (14) that switch between a transmitting state and a shading state of light emitted from light emitting element (25); and substrate (16) through which light that exits plurality of shutter mechanisms (14) is transmitted. The display element also has plasmon coupling section (11) that causes plasmon coupling to occur with light that exits the light valve section (10). Plasmon coupling section (11) includes carrier generation layer (17) that generates carriers with incident light that exits light valve section (10), plasmon excitation layer (19) that has a higher plasma frequency than the frequency of light that is generated in carrier generation layer (17) excited with the light emitted from light emitting element (25), and wave number vector conversion layer (22) that converts the light or surface plasmons generated in plasmon excitation layer (19) into light having a predetermined exit angle. Plasmon excitation layer (19) is sandwiched between first dielectric constant layer (18) and second dielectric constant layer (22).

16 Claims, 9 Drawing Sheets

(51) Int. Cl.
  *G03B 21/00* (2006.01)
  *G02B 5/00* (2006.01)
  *G02B 26/02* (2006.01)
  *G03B 21/20* (2006.01)
  *G03B 21/28* (2006.01)
  *H04N 9/31* (2006.01)
  *G02F 2/02* (2006.01)
  *F21V 8/00* (2006.01)

(52) U.S. Cl.
  CPC .............. *G02B 6/0075* (2013.01); *G02B 26/02* (2013.01); *G03B 21/14* (2013.01); *G03B 21/20* (2013.01); *G03B 21/28* (2013.01); *H04N 9/3152* (2013.01); *G03B 21/204* (2013.01); *G03B 21/2066* (2013.01); *G02F 2/02* (2013.01); *G02F 2202/32* (2013.01); *G02F 2203/10* (2013.01)

(56) References Cited

U.S. PATENT DOCUMENTS

| | | |
|---|---|---|
| 2007/0172171 A1 | 7/2007 | Van Ostrand et al. |
| 2007/0181889 A1* | 8/2007 | Orita .............................. 257/79 |
| 2009/0086477 A1* | 4/2009 | Noba et al. .................... 362/231 |
| 2012/0224148 A1* | 9/2012 | Natsumeda et al. ............. 353/20 |
| 2012/0314188 A1* | 12/2012 | Tominaga et al. ............... 353/20 |
| 2012/0314189 A1* | 12/2012 | Natsumeda et al. ............. 353/20 |
| 2013/0033678 A1* | 2/2013 | Natsumeda et al. ............. 353/20 |
| 2013/0107132 A1* | 5/2013 | Tominaga et al. ............. 348/744 |
| 2013/0308102 A1* | 11/2013 | Natsumeda et al. ............. 353/20 |
| 2014/0022818 A1* | 1/2014 | Natsumeda et al. .......... 362/607 |
| 2014/0139809 A1* | 5/2014 | Natsumeda et al. ............ 353/20 |

FOREIGN PATENT DOCUMENTS

| | | |
|---|---|---|
| JP | 2005-005679 A | 1/2005 |
| JP | 2006-313667 A | 11/2006 |
| JP | 2008-532069 A | 8/2008 |
| JP | 2009-524850 A | 7/2009 |
| WO | 2011/040528 A1 | 4/2011 |

OTHER PUBLICATIONS

Christine Hoepfner, "PhlatLight TM Photonic Lattice LEDs for RPTV Light Engines", Digest, p. 1808-1811, vol. 37.

Communication dated Apr. 2, 2014 from the State Intellectual Property Office of the People's Republic of China in counterpart application No. 201180024053.1.

* cited by examiner

DISPLAY ELEMENT, DISPLAY DEVICE, AND PROJECTION DISPLAY DEVICE

CROSS REFERENCE TO RELATED APPLICATIONS

This application is a National Stage of International Application No. PCT/JP2011/061045 filed on May 13, 2011, which claims priority from Japanese Patent Application No. 2010-112073, filed on May 14, 2010, the contents of all of which are incorporated herein by reference in their entirety.

TECHNICAL FIELD

The present invention relates to a display element, a display device, and a projection display device that use surface plasmons to emit light.

BACKGROUND ART

A projector having solid state light source that uses a light emitting element such as a light emitting diode (LED) or a semiconductor laser (LD) as a light source has been proposed. A projector having solid state light source of this type has an illumination optical system into which light emitted from the light emitting element enters; a light valve having a display element such as a liquid crystal display panel that light that exits the illumination optical system enters or a DMD (Digital Micromirror Device); and a projection optical system that projects light that exits the light valve to a projection plane.

A requirement for the projector, having solid state light source, is that there be a minimum of optical loss in the optical path from the light emitting element to the light valve so as to improve the luminance of projected images.

In addition, as described in Non-Patent Literature 1, such a projector having a solid state light source is restricted by the etendue that depends on the product of the area and emission angle of the light source. In other words, light emitted from the light source cannot be used as projection light unless the product of the light emission area and emission angle of the light source is equal to or smaller than the product of the area of the incident plane of the light valve and the acceptance angle (solid angle) that depends on the F number of the optical system.

Thus, there has been a demand to reduce the etendue of light emitted from the emitting element so as to reduce the foregoing optical loss.

Projectors having solid state light source for business use and home theaters need to emit a light beam in the order of several thousand lumens. Thus, such projectors having solid state light source need to improve the light use efficiency of light emitted from the emitting element and realize high luminance and high directivity.

As an example of a display element having a light source with an improved light use efficiency, as shown in FIG. 1, a spatial optical modulator that has an MEMS (Micro Electro Mechanical Systems) shutter mechanism that selectively shades incident light emitted from light source 1204 has been disclosed (refer to Patent Literature 1). This display element has light source 1204; optical cavity 1202 into which light 1214 emitted from light source 1204 enters; optical modulation array 1206 that modulates light 1214 that exits optical cavity 1202; and cover plate 1207 that covers optical modulation array 1206.

Optical cavity 1202 has optical guide 1208; and substrate 1210 arranged on optical guide 1208 with air gap 1213. Formed on optical guide 1208 is rear reflection plane 1212 including light scattering elements 1209. Optical modulation array 1206 has light transmitting regions 1222 that light that exits optical cavity 1202 enters; and an MEMS shutter mechanism including shutters 1110 that can open and close light transmitting regions 1222. Cover plate 1207 has light transmitting regions 1114 through which light 1214 that has passed through light transmitting regions 1222 of optical modulation array 1206 passes. In this display element, light 1214 is multiply reflected between shutters 1110 and optical cavity 1202, reuses light 1214, and causes it to pass through light transmitting regions 1222. As a result, the display element improves the light use efficiency of light source 1204.

PATENT LITERATURE

Patent Literature 1: JP2008-532069A, Publication (translation version)

Non-Patent Literature

Non-Patent Literature 1: PhlatLight™ Photonic Lattice LEDs for RPTV Light Engines; Christine Hoepfner; SID Symposium Digest 37, 1808 (2006)

SUMMARY OF INVENTION

As described above, in the projector having a solid state light source, light emitted from a light valve at a predetermined emission angle or more (for example, an emission angle of ±15°) does not enter the projection optical system, but becomes optical loss. In the structure presented in Patent Literature 1, the directivity of light that exits the light valve depends on the directivity of light that exits the illumination optical system and then enters the light valve. Thus, in the structure presented in Patent Literature 1, when a light emitting element that emits a light beam in the order of several thousand lumens is used as a light source, high luminance can be achieved. However, it is difficult to narrow the emission angle of light emitted from the display element to less than ±15°. In other words, the display element presented in Patent Literature 1 has a drawback of improper directivity of light that is emitted.

In other words, the structure disclosed in Patent Literature 1 can not realize a display element that satisfies both luminance and directivity that an ordinary projector needs.

An object of the present invention is to provide a display element, a display device, and a projection display device that can solve the forgoing engineering problems.

To realize the foregoing object, a display element according to the present invention includes a light valve section having a plurality of optical shutter means that switch between a transmitting state and a shading state of light emitted from a light emitting element; and a substrate through which light that exits the plurality of optical shutter means is transmitted. The display element also has a plasmon coupling section that is arranged on the substrate and that causes plasmon coupling to occur with light that exits the light valve section. The plasmon coupling section includes a carrier generation layer that generates carriers with incident light that exits the light valve section, a plasmon excitation layer that is stacked above the carrier generation layer and that has a higher plasma frequency than the frequency of light that is generated in the carrier generation layer excited with the light emitted from the light emitting element, and an exit layer that is arranged on the plasmon excitation layer and that converts the light or surface plasmons generated in the plasmon excitation layer into light having a predetermined exit angle. The plasmon excitation layer is sandwiched between two layers having dielectric constants.

A display device according to the present invention includes a display element of the present invention and at least one light emitting element.

A projection display device according to the present invention includes a display device of the present invention and a projection optical system that projects a projection image with light that exits the display device.

According to the present invention, since both luminance and directivity of light that is emitted can be satisfied, a display element that has high luminance and high directivity can be realized.

DESCRIPTION OF EMBODIMENTS

Next, with reference to the accompanying drawings, embodiments of the present invention will be described.

(First Embodiment)

Figure 1:
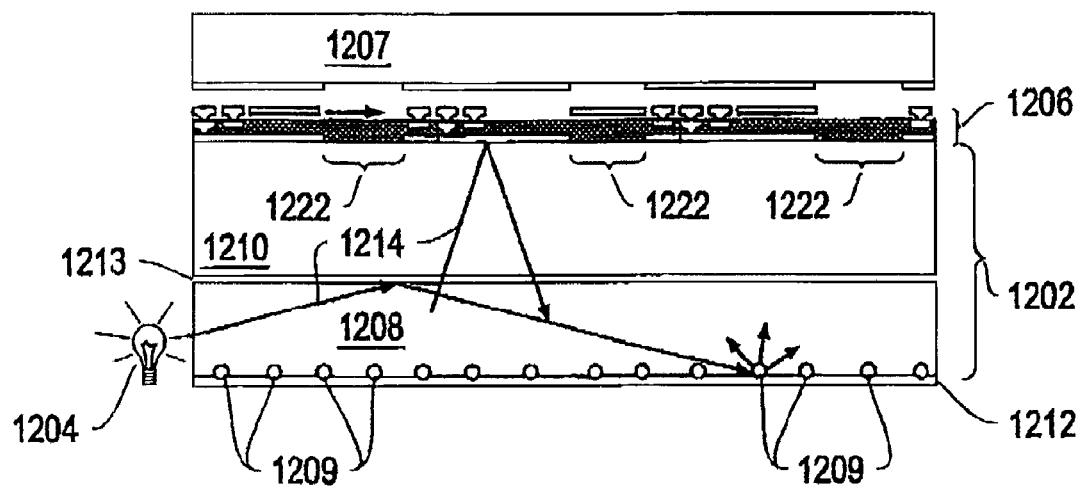
FIG. 1 is a sectional view describing the structure presented in Patent Literature 1.
Figure 2:
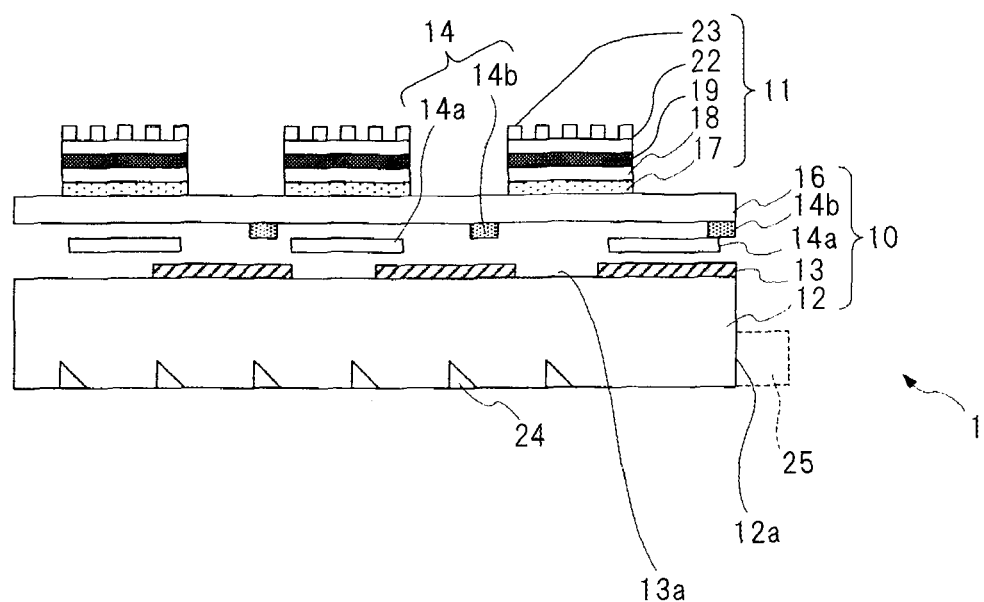
FIG. 2 is a sectional view schematically showing a display element according to a first embodiment.

FIG. 2 is a sectional view schematically showing a display element according to a first embodiment of the present invention. Since the individual layers of the display element are very thin and their thickness largely differs, it is difficult to illustrate the individual layers in exact scale. Thus, the drawings do not illustrate the individual layers in exact scale, but schematically illustrate them.

As shown in FIG. 2, display element 1 according to this embodiment has light valve section 10 including a plurality of shutter mechanisms 14 as a plurality of optical shutter means that switch between a transmitting state and a shading state of light emitted from light emitting element 25 and substrate 16 through which light that exits shutter mechanisms 14 is transmitted. In addition, display element 1 has a plurality of plasmon coupling sections 11 that cause plasmon coupling to occur with light that exits light valve section 10.

Light valve section 10 has light conductor 12 into which light emitted from light emitting element 25 enters; the plurality of shutter mechanisms 14 arranged corresponding to a position of light that exits light conductor 12; and substrate 16 on which the plurality of plasmon coupling sections 11 are two-dimensionally and regularly arranged.

As shown in FIG. 2, arranged on a bottom plane of light conductor 12 on the opposite side of a plurality of plasmon coupling sections 11 are structural members 24 such as micro-prisms or scattering members that control luminous intensity properties. Alternatively, light conductor 12 may have a light diffusion plate (not shown) that is arranged on the foregoing bottom plane or contains dispersed scattering members (not shown).

Arranged on an upper plane of light conductor 12 opposite to the bottom plane is reflection film 13. Reflection film 13 has a plurality of openings 13a that are light transmitting regions corresponding to the plurality of plasmon coupling sections 11 and through which light that exits light conductor 12 enters plasmon coupling sections 11. Reflection film 13 is made of, for example, a metal material such as silver or aluminum or a dielectric constant laminate film.

Shutter mechanisms 14 are arranged on a bottom plane of substrate 16 opposite to light conductor 12. Shutter mechanisms 14 each have MEMS shutter 14a that can open and close opening 13a of reflection film 13; and TFT (Thin Film Transistor) 14b that causes MEMS shutter 14a to open/close opening 13a. MEMS shutter 14a or light conductor 12 side plane of MEMS shutter 14a is made of a reflection material having a relatively high reflectance.

Figure 3:
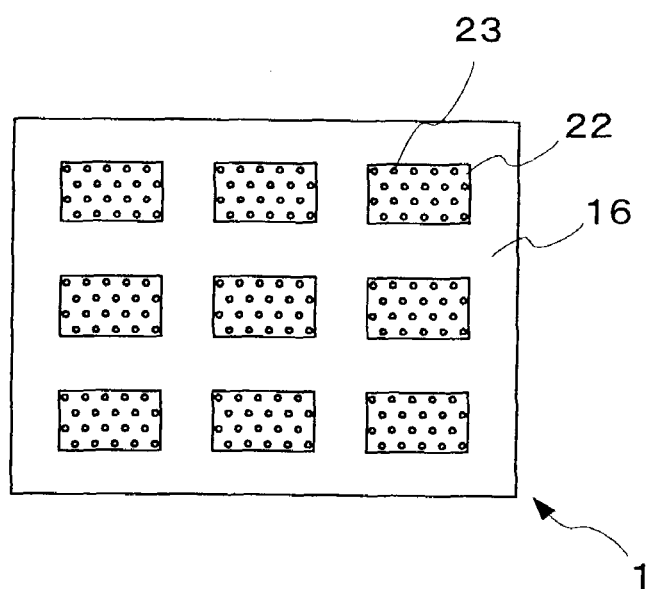
FIG. 3 is a plan view schematically showing the display element according to the first embodiment.

The plurality of plasmon coupling sections 11 are arranged as pixels in a matrix shape corresponding to openings 13a of reflection film 13 arranged on light conductor 12. Likewise, the plurality of shutter mechanisms 14 are arranged to correspond to pixels that is composed of the plurality of plasmon coupling sections 11. FIG. 2 shows plasmon coupling sections 11 that compose three pixels. FIG. 3 shows plasmon coupling sections 11 that comprises nine pixels. Plasmon coupling sections 11 are arranged such that they cover shutter mechanisms 14.

As shown in FIG. 2, plasmon coupling sections 11 each have carrier generation layer 17 that generates carriers with part of light that exits light conductor 12; plasmon excitation layer 19 that is stacked on carrier generation layer 17 and that has a higher plasma frequency than the frequency of light that is generated in carrier generation layer 17 excited with light emitted from light emitting element 25; and wave number vector conversion layer 23 that is stacked as an exit layer on plasmon excitation layer 19 and that converts a wave number vector of light that exits plasmon excitation layer 19 and emits light having a predetermined exit angle.

In addition, plasmon coupling sections 11 each have first dielectric constant layer 18 sandwiched between carrier generation layer 17 and plasmon excitation layer 19; and second dielectric constant layer 22 sandwiched between plasmon excitation layer 19 and wave number vector conversion layer 23. Second dielectric constant layer 22 has a higher dielectric constant than first dielectric constant layer 18.

According to this embodiment, one light emitting element 25 is arranged on light incident plane 12a that is one side plane of planar light conductor 12. Light emitting element 25 may be composed of, for example, a light emitting diode (LED), a laser diode, or a super luminescent diode that emits light having a wave length that carrier generation layer 17 can absorb. In addition, light emitting element 25 is an element that emits light having a frequency that can excite carrier generation layer 17. Light emitted from light emitting element 25 is, for example, ultraviolet light or blue light having a short wave length. If a plurality of types of carrier generation layers 17 are arranged, a plurality of types of light emitting elements 25 that emit light having different frequencies that can excite carrier generation layers 17 may be used. Light emitting element 25 may be arranged apart from light incident plane 12a of light conductor 12. In this case, light emitting element 25 may be optically connected to light conductor 12 by a light conductor such as a light pipe. Alternatively, a plurality of light emitting elements 25 may be arranged along a plurality of side planes of light conductor 12. Further alternatively, a plurality of light emitting elements 25 may be arranged along a bottom plane of light conductor 12 opposite to plasmon coupling section 11 side.

According to this embodiment, light conductor 12 is formed in a planar shape. However, the shape of light conductor 12 is not limited to a rectangular parallelepiped shape. Alternatively, light conductor 12 may be formed in another shape such as a wedge shape. Reflection film 13 may be formed completely on an outer circumferential plane of light conductor 12 excluding light incident plane 12a and openings 13a, or may be formed partly on an outer circumferential plane of light conductor 12. Reflection film 13 may be made of, for example, a metal material such as silver or aluminum or a dielectric constant laminate film. According to this embodiment, light conductor 12 is provided. Alternatively, light conductor 12 may be omitted from light valve section 10. For example, a light source such as light emitting element 25 may be arranged on substrate 16 opposite to shutter mechanisms 14 (on the light incident side of shutter mechanisms 14).

Carrier generation layer 17 is made of an organic fluorescent substance such as rhodamine 6G or sulforhodamine 101; a quantum dot fluorescent substance such as CdSe or CdSe/ZnS quantum dots; an inorganic material such as GaN or GaAs (semiconductor); or an organic material such as (thiophene/phenylene) co-oligomer or Alq3 (semiconductor material). When a fluorescent substance is used, a plurality of fluorescent substances having the same light emission frequency or different light emission frequencies may be contained in carrier generation layer 17. It is preferable that the thickness of carrier generation layer 17 be 1 μm or less.

When plasmon coupling sections 11 correspond to R (red), G (green), and B (blue) pixels, carrier generation layer 17 corresponding to R, G, and B pixels may be made of different materials. When plasmon coupling sections 11 correspond to single-color pixels (for example R), carrier generation layer 17 corresponding to individual pixels may be made of the same material. In this case, the plurality of plasmon coupling sections 11 do not need to be separated corresponding to individual pixels, but be integrally formed together.

Plasmon excitation layer 19 is a fine particle layer or a thin film layer made of a material having a plasma frequency higher than the frequency of light that is generated in carrier generation layer 17 excited with light emitted in light emitting element 25 (light emission frequency). In other words, plasmon excitation layer 19 has a negative dielectric constant at the light emission frequency of light generated in carrier generation layer 17 excited with light emitted from light emitting element 25.

Examples of the material of plasmon excitation layer 19 include gold, silver, copper, platinum, palladium, rhodium, osmium, ruthenium, iridium, iron, tin, zinc, cobalt, nickel, chromium, titanium, tantalum, tungsten, indium, aluminum, and an alloy thereof. Among them, it is preferable that the material of plasmon excitation layer 19 be gold, silver, copper, platinum, aluminum, or an alloy that contains one of these metals as a primary component. It is more preferable that the material of plasmon excitation layer 19 be gold, silver, aluminum, or an alloy containing one of these metals as a primary component. It is preferable that plasmon excitation layer 19 be formed with a thickness of 200 nm or less. It is more preferable that plasmon excitation layer 19 be formed with a thickness approximately in the range from 10 nm to 100 nm.

When the plurality of plasmon coupling sections 11 correspond to R, G, and B pixels, plasmon excitation layers 19 corresponding to these pixels may be made of different materials. At this point, it is preferable that plasmon excitation layer 19 that corresponds to R pixels be made of gold or an alloy containing gold as a primary component; plasmon excitation layer 19 that corresponds to G pixels be made of gold, silver, or an alloy containing gold or silver as a primary component; and that plasmon excitation layer 19 that corresponds to B pixels be made of silver or an alloy containing silver as a primary component. If necessary, plasmon excitation layer 19 and carrier generation layer 17 may be integrally formed together such that R, G, and B pixels are continuously formed. If the plurality of plasmon coupling sections 11 correspond to single-color pixels, plasmon excitation layers 19 that correspond to individual pixels may be made of the same material.

Display element 1 according to this embodiment is structured such that the effective dielectric constant of an incident side portion including the entire structure that has first dielectric constant layer 18 stacked on carrier generation layer 17 side of plasmon excitation layer 19 and substrate 16 (hereinafter simply referred to as the incident side portion) is higher than that of an exit side portion including the entire structure that has second dielectric constant layer 22 stacked on wave number vector conversion layer 23 side of plasmon excitation layer 19 and a medium that contacts wave number vector conversion layer 23 (hereinafter simply referred to as the exit side portion). The entire structure stacked on carrier generation layer 17 side of plasmon excitation layer 19 includes first dielectric constant layer 18, carrier generation layer 17, and substrate 16. The entire structure stacked on wave number vector conversion layer 23 side of plasmon excitation layer 19 includes second dielectric constant layer 22 and wave number vector conversion layer 23.

In other words, according to the first embodiment, the effective dielectric constant of the incident side portion including substrate 16, carrier generation layer 17, and first dielectric constant layer 18 with respect to plasmon excitation layer 19 is higher than that of the exit side portion including second dielectric constant layer 22, wave number vector conversion layer 23 and the medium contacting wave number vector conversion layer 23 with respect to plasmon excitation layer 19.

Specifically, the real part of the complex effective dielectric constant of the incident side portion (carrier generation layer 17 side) of plasmon excitation layer 19 is set to be lower than the real part of the complex effective dielectric constant of the exit side portion (wave number vector conversion layer 23 side) of plasmon excitation layer 19.

Now, the complex dielectric constant of first dielectric constant layer 18 is denoted by $\epsilon_f(\lambda_o)$, the real part thereof is denoted by $\epsilon_{fr}(\lambda_o)$, the imaginary part thereof is denoted by $\epsilon_{fi}(\lambda_o)$, the complex dielectric constant of second dielectric constant layer 22 is denoted by $\epsilon_h(\lambda_o)$, the real part thereof is denoted by $\epsilon_{hr}(\lambda_o)$, and the imaginary part thereof is denoted by $\epsilon_{hi}(\lambda_o)$, then the relationship of $1 \leq \epsilon_{fr}(\lambda_o) < \epsilon_{hr}(\lambda_o)$ is satisfied where $\lambda_o$ is the wavelength in vacuum of light that enters the first (second) dielectric constant layer.

It is preferable that imaginary part $\epsilon_{fi}(\lambda_o)$ and imaginary part $\epsilon_{hi}(\lambda_o)$ of the frequency of emission light be as low as possible so as to cause plasmon coupling to easily occur and reduce optical loss.

Likewise, it is preferable that real part $\epsilon_{fr}(\lambda_o)$ of first dielectric constant layer 18 be as low as possible. Since the angle of light that enters wave number vector conversion layer 23 can be decreased, light that is emitted can be effectively extracted from display element 1. In contrast, it is preferable that real part $\epsilon_{hr}(\lambda_o)$ of second dielectric constant layer 22 be as high as possible. Since the angle of light that enters wave number vector conversion layer 23 can be decreased, light that is emitted can be effectively extracted from display element 1. Hereinafter, unless otherwise specified, the dielectric constant represents the real part of the complex effective dielectric constant of the frequency of light that is emitted.

Assuming that directions in parallel with the interface of plasmon excitation layer 19 are denoted by x and y axes; a direction perpendicular to the interface of plasmon excitation layer 19 is denoted by z axis; an angular frequency of light that exits carrier generation layer 17 is denoted by ω; a dielectric constant distribution of a dielectric substance at the incident side portion and exit side portion with respect to plasmon excitation layer 19 is denoted by $\epsilon(\omega, x, y, z)$; a z component of the wave number of surface plasmons is denoted by $k_{spp,z}$; and an imaginary unit is denoted by j, then complex effective dielectric constant $\epsilon_{\mathit{eff}}$ can be expressed as follows.

[Formula 1]

$$\epsilon_{\mathit{eff}} = \frac{\int\int\int_D \epsilon(\omega, x, y, z)\exp(2jk_{spp,z}z)}{\int\int\int_D \exp(z)} \quad \text{Formula (1)}$$

Integration range D is a range of the incident side portion or exit side portion in a three dimensional coordination with respect to plasmon excitation layer 19. In other words, the ranges in the directions of the x axis and y axis in integration range D are ranges that do not include a medium on the outer circumferential plane of the structure that the incident side portion or exit side portion includes, but are ranges that include the outer edge of a plane in parallel with the interface of plasmon excitation layer 19. On the other hand, the range in the direction of the z axis in integration range D is the range of the incident side portion or exit side portion (including the medium). It is assumed that the interface between plasmon excitation layer 19 and a layer adjacent thereto is at the position where z=0, that the range in the direction of the z axis in integration range D is a range from the interface to infinity on the foregoing adjacent layer side of plasmon excitation layer 19, and that the direction that is apart from the interface is referred to as the (+) z direction in Formula (1).

On the other hand, assuming that the real part of the dielectric constant of plasmon excitation layer 19 is denoted by $\epsilon_{\mathit{metal}}$ and the wave number of light in vacuum is denoted by $k_0$, a z component of the wave number of surface plasmons, $k_{spp,z}$, and x and y components of the wave number of the surface plasmons, $k_{spp}$, can be expressed as follows.

[Formula 2]

$$k_{spp,z} = \sqrt{\epsilon_{\mathit{eff}} k_0^2 - k_{spp}^2} \quad \text{Formula (2)}$$

[Formula 3]

$$k_{spp} = k_0 \sqrt{\frac{\epsilon_{\mathit{eff}} \epsilon_{\mathit{metal}}}{\epsilon_{\mathit{eff}} + \epsilon_{\mathit{metal}}}} \quad \text{Formula (3)}$$

Thus, by inserting dielectric constant distribution $\epsilon_{in}$ (ω, x, y, z) of the incident side portion of plasmon excitation layer 19 and dielectric constant distribution $\epsilon_{out}$ (ω, x, y, z) of the exit side portion of plasmon excitation layer 19 as $\epsilon$ (ω, x, y, z) into Formula (1), Formula (2), and Formula (3), complex effective dielectric constant layer $\epsilon_{\mathit{effin}}$ of the incident side portion with respect to plasmon excitation layer 19 and complex effective dielectric constant $\epsilon_{\mathit{effout}}$ of the exit side portion with respect to plasmon excitation layer 19 are obtained. In practice, by giving an appropriate initial value as complex effective dielectric constant $\epsilon_{\mathit{eff}}$ and iteratively calculating Formula (1), Formula (2) and Formula (3), complex effective dielectric constant $\epsilon_{\mathit{eff}}$ can be easily obtained.

Assuming that an effective interaction distance of surface plasmons is a distance for which the intensity of surface plasmons becomes $e^{-2}$, effective interaction distance $d_{\mathit{eff}}$ of the surface plasmons can be expressed as follows.

[Formula 4]

$$d_{\mathit{eff}} = \mathrm{Im}\left[\frac{1}{k_{spp,z}}\right]$$ Formula (4)

It is preferable that the imaginary part of the complex dielectric constant of any layer including light conductor 12 (excluding carrier generation layer 17 and plasmon excitation layer 19) and a medium that contacts wave number vector conversion layer 23 be as small as possible. When the imaginary part of the complex dielectric constant is set to be as small as possible, plasmon coupling can easily occur, and reduction of optical loss can be achieved.

The ambient medium of plasmon coupling sections 11, namely the medium that makes contact with light conductor 12 and wave number vector conversion layer 23, may be either solid, liquid, or gaseous. In addition, the ambient medium on light conductor 12 side may be different from that on wave number vector conversion layer 23 side.

It is preferable that first dielectric constant layer 18 be, for example, $SiO_2$ nano-rod array film or a thin film or a porous film of $SiO_2$, $AlF_3$, $MgF_2$, $Na_3AlF_6$, NaF, LiF, $CaF_2$, $BaF_2$, or a low dielectric constant plastic.

It is preferable that second dielectric constant layer 22 be a high dielectric constant material such as diamond, $TiO_2$, $CeO_2$, $Ta_2O_5$, $ZrO_2$, $Sb_2O_3$, $HfO_2$, $La_2O_3$, $NdO_3$, $Y_2O_3$, ZnO, or $Nb_2O_5$.

Figure 4:
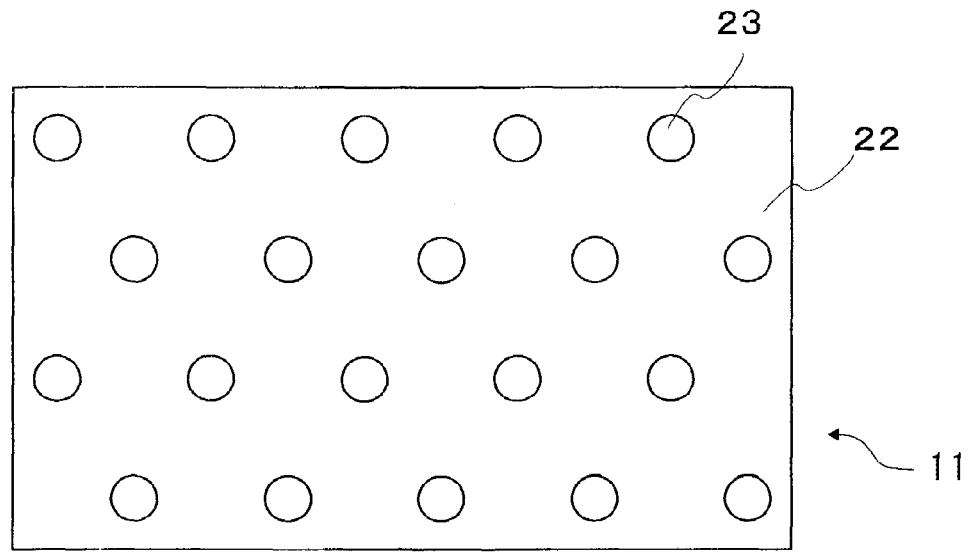
FIG. 4 is a plan view showing a plasmon coupling section of the display element according to the first embodiment.

FIG. 4 is a perspective view showing wave number vector conversion layer 23 of plasmon coupling sections 11. Wave number vector conversion layer 23 is an exit layer on which a wave number vector of light that enters wave number vector conversion layer 23 is converted, light is extracted from second dielectric constant layer 22, and then the light is emitted from display element 1. In other words, wave number vector conversion layer 23 converts the exit angle of light that exits second dielectric constant layer 22 into a predetermined angle such that display element 1 emits light having the converted angle. Namely, wave number vector conversion layer 23 causes display element 1 to emit light in a direction nearly orthogonal to the interface with second dielectric constant layer 22.

Wave number vector conversion layer 23 has, for example, a surface relief grating; a periodic structure typified by photonic crystal; a quasi-periodic structure; one of these structures that contain defects; a texture structure having a wavelength higher than that of light emitted from display element 1; an uneven surface structure; a hologram; or a micro lens array. The quasi-periodic structure represents a quasi-crystalline structure that is a special coherent structure having five symmetries or ten symmetries that are not permitted for crystals. Among them, it is preferable that wave number vector conversion layer 23 be a periodic structure typified by photonic crystal, a quasi-periodic structure, one of these structures containing defects, or a micro lens array. They can not only improve light extraction efficiency, but can also control the directivity. When wave number vector conversion layer 23 is photonic crystal, it is preferable that it have a triangular grating crystalline structure shown in FIG. 4. Wave number vector conversion layer 23 may be formed in such a manner that a periodic convex structure or a periodic concave structure is formed on a planar substrate.

Figure 5:
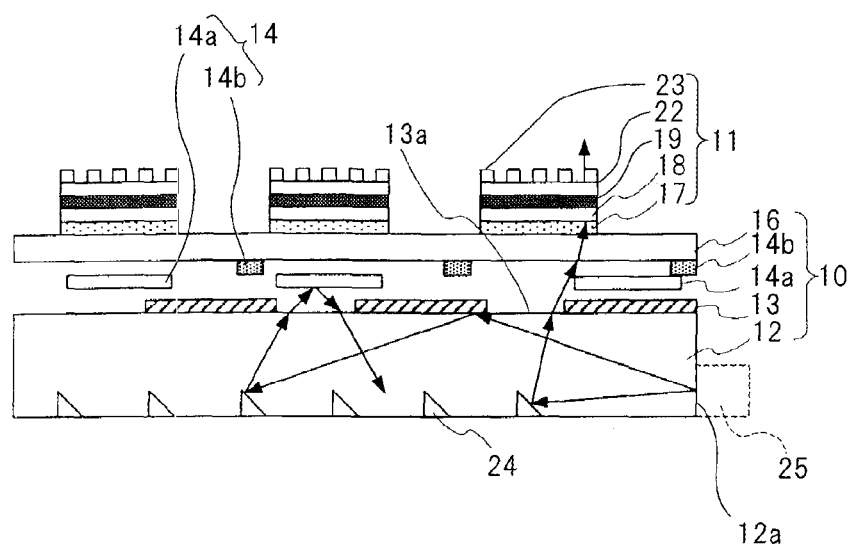
FIG. 5 is a sectional view describing an action of light in the display element according to the first embodiment.

In display element 1 having the foregoing structure, the action of light performed after light emitted from light emitting element 25 enters light conductor 12 until light exits wave number vector conversion layer 23 of plasmon coupling sections 11 will be described. FIG. 5 is a sectional view describing the action of light in display element 1.

As shown in FIG. 5, light emitted from light emitting element 25 is transmitted through light incident plane 12a of light conductor 12 and propagates therein while it is totally reflected therein. When light that propagates in light conductor 12 reaches structural members 24, structural members 24 change orientation of light and then the light enters openings 13a of reflection film 13. At this point, if TFT 14b of shutter mechanism 14 is in the ON state, MEMS shutter 14a will have been moved to a position at which opening 13a is exposed. Thus, light that passes through opening 13a enters carrier generation layer 17 through substrate 16. In contrast, if TFT 14b is in the OFF state, MEMS shutter 14a shades light and reflects it to light conductor 12. Light that passes through opening 13a of reflection film 13 enters plasmon coupling section 11 and then exits wave number vector conversion layer 23. By repeating this operation, most of light that enters light conductor 12 exits desired plasmon coupling section 11 that comprises a pixel.

Carrier generation layer 17 generates carriers with light that enters therein. The generated carriers plasmon-couple with free electrons contained in plasmon excitation layer 19. Plasmon coupling causes light to enter second dielectric constant layer 22. Wave number vector conversion layer 23 diffracts the light and then it exits display element 1. Light that exits one point of the interface between plasmon excitation layer 19 and second dielectric constant layer 22 has a ring-shaped intensity distribution in which light spreads in a concentric circular shape as it propagates. Assuming that the exit angle with the highest intensity is referred to as the center exit angle and the angular width from the center exit angle to an exit angle having the half intensity of the highest intensity is referred to as the exit angular width, the center exit angle and the exit angular width of light that exits second dielectric constant layer 22 depend on the dielectric constant of plasmon excitation layer 19 and the effective dielectric constants of layers that sandwich plasmon excitation layer 19.

Assuming that the pitch of the periodic structure of wave number vector conversion layer 23 is denoted by Λ, the complex effective dielectric constant of the exit side portion (wave number vector conversion layer 23 side) of plasmon excitation layer 19 is denoted by $\in_{\mathit{effout}}$, the dielectric constant of the ambient medium is denoted by $\in_m$, and the wave length in vacuum of light that exits wave number vector conversion layer 23 is denoted by $\lambda_o$, then center exit angle $\theta_{rad}$ of light that exits wave number vector conversion layer 23 can be expressed as follows.

[Formula 5]

$$\theta_{rad} = \mathrm{Sin}^{-1}\left(\frac{\mathrm{Re}[\sqrt{\varepsilon_{\mathit{effout}}}]\sin\theta - i\frac{\lambda_0}{\Lambda}}{\mathrm{Re}[\sqrt{\varepsilon_{in}}]}\right)$$ Formula (5)

where i is a positive or negative integer.

In other words, part of light that enters carrier generation layer 17 exits display element 1 in the direction that depends on the properties of plasmon coupling sections 11. Since the luminous intensity distribution of light emitted from display element 1 depends only on the properties of plasmon coupling sections 11, display element 1 can have high directivity. In other words, the luminous intensity distribution of light emitted from display element 1 does not depend on the luminous intensity distribution of light emitting element 25.

FIG. 6A to FIG. 6E show a manufacturing process for plasmon coupling sections 11 of display element 1. The manufacturing process shown in these drawings is just an example and therefore the present invention is not limited thereto. Since light valve section 10 in which plasmon coupling sections 11 are formed is a known transmission type light valve, the description of the manufacturing process for light valve section 10 will be omitted.

Figure 6A:
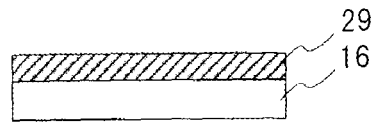
FIG. 6A is a sectional view describing a manufacturing method for the plasmon coupling sections of the display element according to the first embodiment.
Figure 6B:
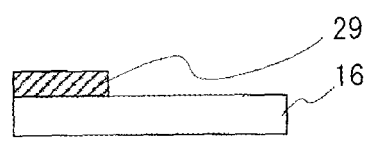
FIG. 6B is a sectional view describing the manufacturing method for the plasmon coupling sections of the display element according to the first embodiment.

First, as shown in FIG. 6A, resist film 29 is coated on substrate 16 of light valve section 10 using the spin coat technique. Thereafter, as shown in FIG. 6B, part of resist film 29 corresponding to openings 13a of reflection film 13 formed on light conductor 12 is removed using, for example, the electron beam, photo lithography, or imprint technique.

Figure 6C:
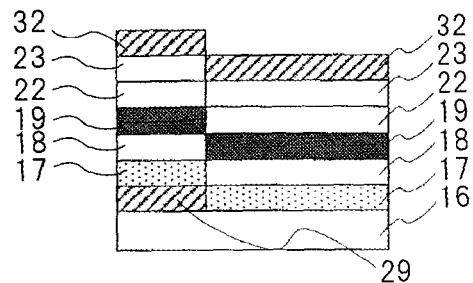
FIG. 6C is a sectional view describing the manufacturing method for the plasmon coupling sections of the display element according to the first embodiment.

Thereafter, as shown in FIG. 6C, carrier generation layer 17 is coated on substrate 16 using the spin coat technique. Thereafter, first dielectric constant layer 18 is formed on carrier generation layer 17 and then plasmon excitation layer 19 is formed on first dielectric constant layer 18 using, for example, physical vapor deposition, electron beam vapor deposition, or spattering technique. Thereafter, second dielectric constant layer 22 is formed on plasmon excitation layer 19.

Figure 6D:
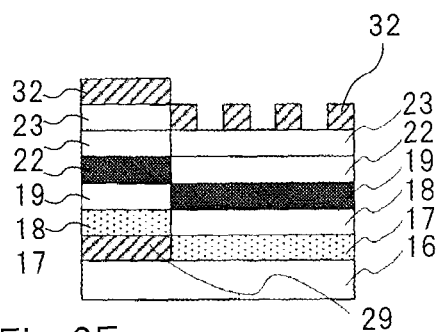
FIG. 6D is a sectional view describing the manufacturing method for the plasmon coupling sections of the display element according to the first embodiment.
Figure 6E:
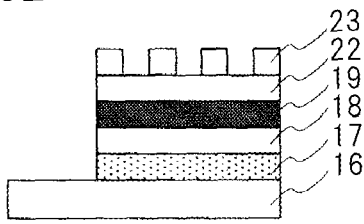
FIG. 6E is a sectional view describing the manufacturing method for the plasmon coupling sections of the display element according to the first embodiment.

Thereafter, wave number vector conversion layer 23 made of photonic crystal is formed on carrier generation layer 17. Thereafter, as shown in FIG. 6D, resist film 32 is coated on wave number vector conversion layer 23 using the spin coat technique and then a negative pattern of photonic crystal is transferred to resist film 32 corresponding to openings 13a using, for example, electron beam, photolithography, or imprint technique. Wave number vector conversion layer 23 is dry-etched for a desired depth using a dry etching technique. Thereafter, as shown in FIG. 6E, resist film 29 and the individual layers that compose plasmon coupling sections 11 formed on resist film 29 are peeled off from substrate 16. As a result, plasmon coupling sections 11 are formed at predetermined positions of substrate 16 corresponding to openings 13a.

As described above, in display element 1 according to the first embodiment, the exit angle of light that exits wave number vector conversion layer 23 depends on the effective dielectric constant of the incident side portion of plasmon excitation layer 19 and the effective dielectric constant of the exit side portion thereof. Thus, the directivity of the light emitted from display element 1 is not restricted by the directivity of light emitting element 25. In addition, using plasmon coupling in the light emission process, display element 1 according to this embodiment can narrow the emission angle of light that is emitted and thereby improve the directivity of the light that is emitted. In other words, according to this embodiment, the etendue of light emitted from display element 1 can be decreased regardless of the etendue of light emitting element 25. In addition, since the etendue of the light emitted from display element 1 is not restricted by the etendue of light emitting element 25, if a plurality of light emitting elements 25 are provided, while the etendue of the light emitted from display element 1 is kept low, incident lights of light emitting elements 25 can be combined.

Next, display elements according to other embodiments will be described. Display elements according to other embodiments are different from the display element according to the first embodiment in plasmon coupling sections or part of structure. Thus, in display elements according to the other embodiments, similar structural portions to those of the first embodiment are denoted by similar reference numerals and their description will be omitted.

(Second Embodiment)

Figure 7:
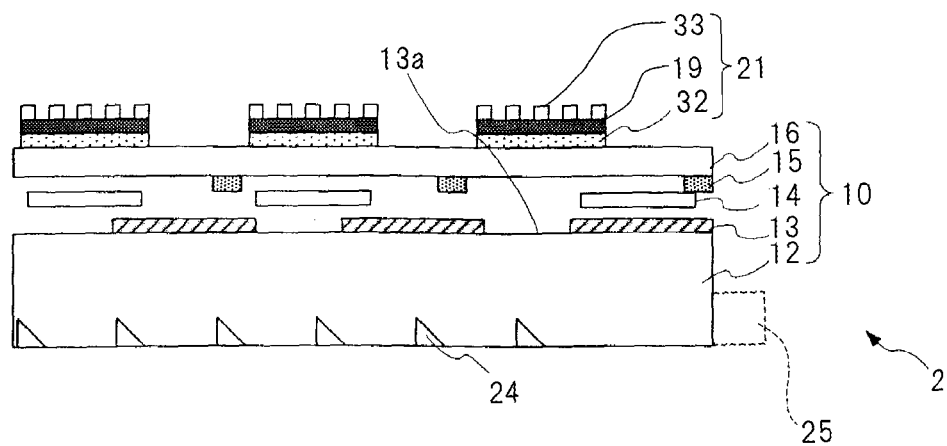
FIG. 7 is a sectional view schematically showing a display element according to a second embodiment.

FIG. 7 is a sectional view schematically showing a display element according to a second embodiment of the present invention. The display element according to the second embodiment is different from display element 1 according to the first embodiment in the structure of plasmon coupling sections. In display element 1 according to the foregoing first embodiment, light excited in plasmon excitation layer 19 exits wave number vector conversion layer 23. The display element according to the second embodiment is different from that according to the first embodiment in that surface plasmons that occur in the plasmon excitation layer exit the wave number vector conversion layer as light. The effective dielectric constant of the incident side portion of the plasmon excitation layer is set to be higher than the effective dielectric constant of the exit side portion of the plasmon excitation layer.

As shown in FIG. 7, plasmon coupling sections 21 of display element 2 according to the second embodiment each have a stacked structure in which carrier generation layer 32, plasmon excitation layer 19, and wave number vector conversion layer 33 are successively stacked on substrate 16 of light valve section 10.

A second dielectric constant layer may be arranged between plasmon excitation layer 19 and carrier generation layer 32. Alternatively, a first dielectric constant layer may be arranged between plasmon excitation layer 19 and wave number vector conversion layer 33. The dielectric constant of the second dielectric constant layer is set to be higher than that of the first dielectric constant layer. The thicknesses of the first dielectric constant layer and the second dielectric constant layer need to be smaller than those obtained from Formula (4).

Plasmon excitation layer 19 is sandwiched between two layers having dielectric constants. According to the second embodiment, these two layers correspond to carrier generation layer 32 and wave number vector conversion layer 33. In display element 2 according to this embodiment, the effective dielectric constant of the incident side portion including substrate 16 and carrier generation layer 32 with respect to plasmon excitation layer 19 is higher than the effective dielectric constant of the exit side portion including wave number vector conversion layer 33 and the medium with respect to plasmon excitation layer 19.

Specifically, the real part of the complex effective dielectric constant of the incident side portion (carrier generation layer 32 side) of plasmon excitation layer 19 is set to be higher than the real part of the complex effective dielectric constant of the exit side portion (wave number vector conversion layer 33 side) of plasmon excitation layer 19.

It is preferable that the imaginary part of the complex dielectric constant of any layer including light conductor 12 (excluding resist film 32 and plasmon excitation layer 19) and a medium that contacts wave number vector conversion layer 33 be as small as possible. When the imaginary part of the complex dielectric constant is set to be as small as possible, plasmon coupling is managed to easily occur so as to reduce optical loss.

In display element 2 having the foregoing structure, the action of light performed after light emitted from light emitting element 25 enters plasmon coupling section 21 until light exits wave number vector conversion layer 33 will be described.

Like display element 1 according to the first embodiment, light that is emitted from light emitting element 25 passes through light valve section 10 and then enters desired plasmon coupling section 21 that comprises a pixel. Light enters carrier generation layer 32 through light valve section 10. Carrier generation layer 32 generates carriers having incident light. The generated carriers plasmon-couple with free electrons contained in plasmon excitation layer 19. Through plasmon coupling, surface plasmons are excited at the interface between plasmon excitation layer 19 and wave number vector conversion layer 33. Wave number vector conversion layer 33 diffracts the excited surface plasmons and then light exits display element 2.

If the dielectric constant at the interface between plasmon excitation layer 19 and wave number vector conversion layer 33 is uniform, namely the interface is plane, surface plasmons excited at the interface cannot be extracted. Thus, according to this embodiment, since wave number vector conversion layer 33 causes the dielectric constant at the interface to vary, surface plasmons are diffracted and extracted as light. Light that exits one point of wave number vector conversion layer 33 has a ring-shaped luminance intensity distribution that concentrically spreads as the light propagates. Assuming that the exit angle having the highest intensity is referred to as the center exit angle and that the pitch of the periodic structure of wave number vector conversion layer 33 is denoted by $\Lambda$, center exit angle $\theta_{rad}$ of light that exits wave number vector conversion layer 33 can be expressed as follows.

[Formula 6]

$$\theta_{rad} = \operatorname{Sin}^{-1}\left(\frac{k_{spp} - i\frac{2\pi}{\Lambda}}{k_0}\right) \quad \text{Formula (6)}$$

where i is a positive or negative integer. Since the wave number at the interface between plasmon excitation layer 15 and wave number vector conversion layer 17 is only a wave number approximately obtained from Formula (3), the angle distribution of light that exits wave number vector conversion layer 33 obtained from Formula (6) also becomes narrow.

Like the first embodiment, in display element 2 according to the second embodiment having the foregoing structure, part of light that enters second dielectric constant layer 22 exits display element 2 in a direction that depends on the properties of plasmon coupling sections 21. Thus, since the luminous intensity distribution of light emitted from display element 2 only depends on the properties of plasmon coupling sections 21, display element 2 can have high directivity. In addition, since display element 2 according to the second embodiment has a smaller number of layers than display element 1 according to the first embodiment, the number of steps of the manufacturing process can be decreased.

(Third Embodiment)

Figure 8:
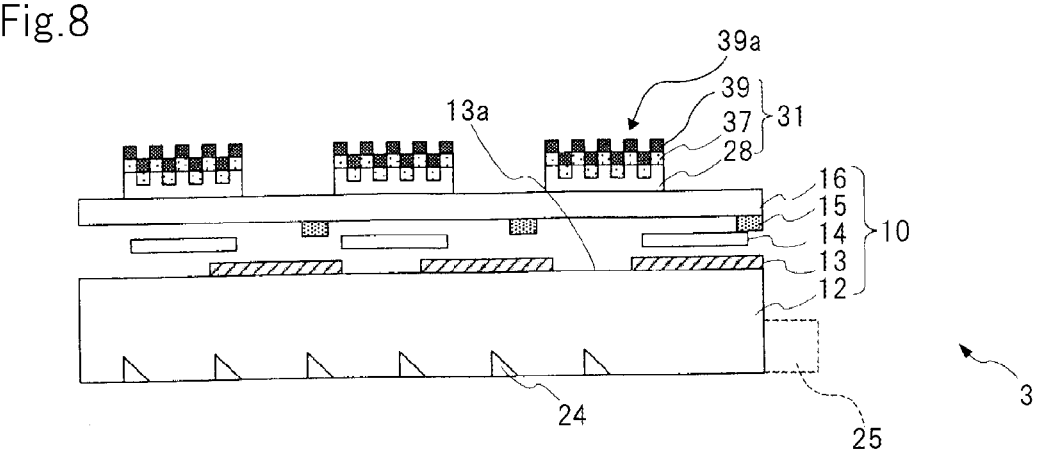
FIG. 8 is a sectional view schematically showing a display element according to a third embodiment.

FIG. 8 is a sectional view schematically showing a display element according to a third embodiment of the present invention. The display element according to the third embodiment is different from display element 1 according to the first embodiment as regards the structure of plasmon coupling sections.

As shown in FIG. 8, plasmon coupling sections 31 of display element 3 according to the third embodiment have a stacked structure in which base layer 28, carrier generation layer 37, and plasmon excitation layer 39 are successively stacked on substrate 16 of light valve section 10. Plasmon excitation layer 39 according to the third embodiment has periodic structure 39a that has the functions of the foregoing wave number vector conversion layers 23 and 33. Periodic structure 39a has a one-dimensional or two-dimensional grating structure (uneven structure). Likewise, base layer 28 and carrier generation layer 37 have a periodic structure in the shape of periodic structure 39a of plasmon excitation layer 39.

When light enters carrier generation layer 37, surface plasmons occur at the interface between plasmon excitation layer 39 and a medium that makes contact with thereof and at the interface between carrier generation layer 37 and plasmon excitation layer 39. The surface plasmons can be extracted as light from plasmon excitation layer 39 in the direction that satisfies Formula (9) that follows.

Specifically, the angular frequency in vacuum of light that exits carrier generation layer 37 is denoted by ω, the light speed in vacuum is denoted by c, the dielectric constant of plasmon excitation layer 39 is denoted by $\epsilon_{metal}$, the dielectric constant of carrier generation layer 37 is denoted by $\epsilon_{sub}$, the dielectric constant of the medium that makes contact with plasmon excitation layer 39 is denoted by $\epsilon_{medi}$, the wave number of surface plasmons at the interface between plasmon excitation layer 39 and the medium that contacts thereof is denoted by $k_{spp.\ medi}$, the wave number of surface plasmons at the interface between carrier generation layer 37 and plasmon excitation layer 39 is denoted by $k_{spp.\ sub}$, the wave number vector in the x direction of periodic structure 39a of plasmon excitation layer 39 is denoted by $K_x$, and the wave number vector in the y direction of periodic structure 39a of plasmon excitation layer 39 is denoted by $K_y$ (where the xy plane is a plane in parallel with substrate 16).

[Formula 7]

$$k_{spp,medi} = \frac{\omega}{c}\sqrt{\frac{\epsilon_{metal}\epsilon_{medi}}{\epsilon_{metal} + \epsilon_{medi}}} \quad (7)$$

[Formula 8]

$$k_{spp,sub} = \frac{\omega}{c}\sqrt{\frac{\epsilon_{metal}\epsilon_{subi}}{\epsilon_{metal} + \epsilon_{sub}}} \quad (8)$$

[Formula 9]

$$k_{spp,medi} + mK_x + nK_y = \omega/c\sqrt{\epsilon_{medi}}\sin\theta \quad (9)$$

[Formula 10]

$$k_{spp,medi} + mK_x + nK_y = k_{spp,sub} \quad (10)$$

Light exits plasmon excitation layer 39 in the direction of angle θ that satisfies Formula (9). In this case, m and n are positive or negative integers. When Formula (10) is satisfied, the intensity of light emitted from display element 3 becomes the highest.

FIG. 9A to FIG. 9H show a manufacturing process for the plasmon coupling sections of display element 3 according to the third embodiment.

Figure 9A:
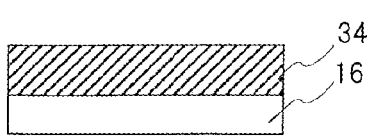
FIG. 9A is a sectional view describing a manufacturing method for a plasmon coupling sections of the display element according to the third embodiment.
Figure 9B:
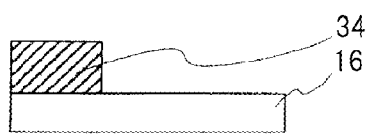
FIG. 9B is a sectional view describing the manufacturing method for the plasmon coupling sections of the display element according to the third embodiment.

First, as shown in FIG. 9A, resist film 34 is coated on substrate 16 of light valve section 10 using the spin coat technique. Thereafter, as shown in FIG. 9B, part of resist film 34 corresponding to openings 13a of reflection film 13 formed on light conductor 12 is removed using, for example, electron beam, photo lithography, or imprint technique.

Figure 9C:
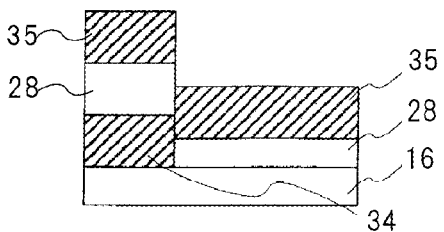
FIG. 9C is a sectional view describing the manufacturing method for the plasmon coupling sections of the display element according to the third embodiment.
Figure 9D:
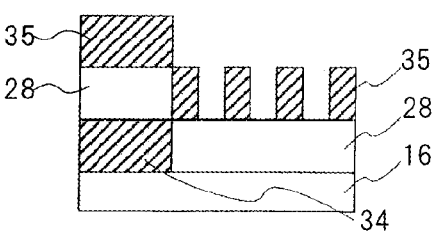
FIG. 9D is a sectional view describing the manufacturing method for the plasmon coupling sections of the display element according to the third embodiment.
Figure 9E:
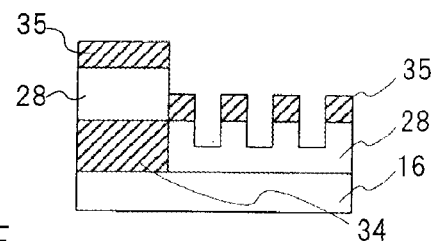
FIG. 9E is a sectional view describing the manufacturing method for the plasmon coupling sections of the display element according to the third embodiment.

Thereafter, as shown in FIG. 9C, base layer 28 and resist film 35 are formed on substrate 16 using a film coating technique such as spin coat, vapor deposition, or spattering technique. Thereafter, as shown in FIG. 9D and FIG. 9E, the desired pattern of plasmon excitation layer 39 is drawn on resist film 35 using electron beam, photolithography, or imprint technique and then the pattern is transferred to base layer 28 using wet or dry etching technique.

Figure 9F:
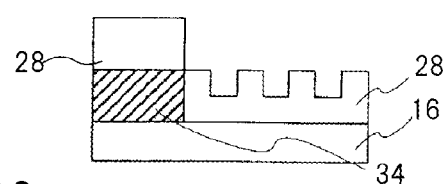
FIG. 9F is a sectional view describing the manufacturing method for the plasmon coupling sections of the display element according to the third embodiment.
Figure 9G:
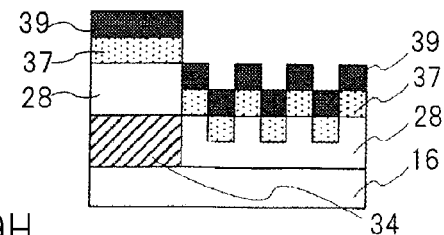
FIG. 9G is a sectional view describing the manufacturing method for the plasmon coupling sections of the display element according to the third embodiment.
Figure 9H:
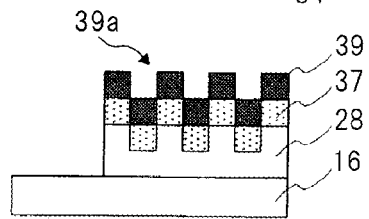
FIG. 9H is a sectional view describing the manufacturing method for the plasmon coupling sections of the display element according to the third embodiment.

Thereafter, as shown in FIG. 9F, resist film 35 is removed from base layer 28 and then as shown in FIG. 9G, carrier generation layer 37 and plasmon excitation layer 39 are successively formed on base layer 28 using a film forming technique such as spin coat, vapor deposition, or spattering technique. Finally, as shown in FIG. 9H, along with resist film 34, individual layers that comprises plasmon coupling sections 31 formed on resist film 34 are peeled off from substrate 16. As a result, plasmon coupling sections 31 are formed at predetermined positions on substrate 16 corresponding to openings 13a. It should be appreciated that this manufacturing process is just an example and therefore the present invention is not limited thereto.

The third embodiment having the foregoing structure can obtain the same effect as the first and second embodiments and thereby can realize a display element having high luminance and high directivity. In addition, since the number of layers of the display element according to the third embodiment is smaller than that according to the first and second embodiments, the number of steps of the manufacturing process can be decreased.

According to the first to third embodiments, shutter mechanisms 14 are arranged on the incident side of plasmon coupling sections 11, 21, and 31. Alternatively, shutter mechanisms 14 may be arranged on the exit side of plasmon coupling sections 11, 21, and 31. In this case, like the foregoing embodiments, the directivity of light emitted from the display element can be improved. However, in this case, since light that passes through light conductor 12 enters the plasmon coupling sections, optical loss occurs in pixels whose shutter mechanisms 14 are closed. Thus, the structures of the foregoing embodiments are preferable.

(Fourth Embodiment)

Figure 10:
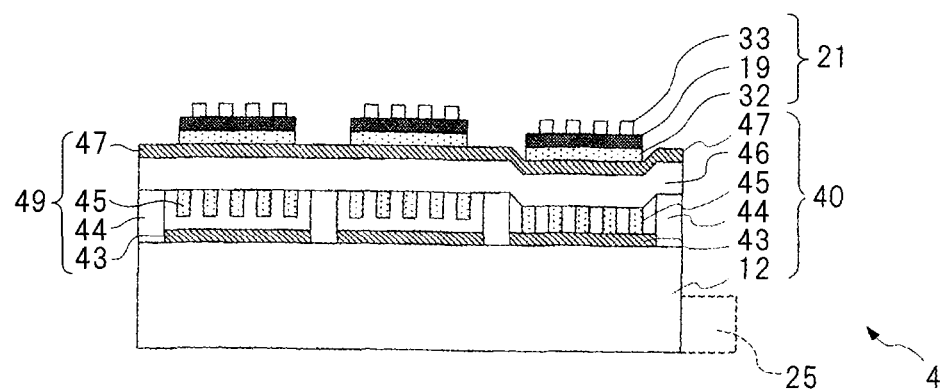
FIG. 10 is a sectional view schematically showing a display element according to a fourth embodiment.

FIG. 10 is a sectional view schematically showing a display element according to a fourth embodiment of the present invention. The display element according to the fourth embodiment is different from those according to the first to third embodiments in that light valve section has a plurality of optical connection mechanisms as a plurality of optical shutter means that switch between a transmitting state and a shading state for light emitted from a light emitting element. Since plasmon coupling sections according to the fourth embodiment are the same as plasmon coupling section 21 according to the second embodiment, their description will be omitted.

As shown in FIG. 10, light valve section 40 of display element 4 according to the fourth embodiment has light conductor 42 into which light emitted from light emitting element 25 enters; optical connection mechanism 49 arranged at a position that light that exits light conductor 42 enters; and substrate 46 on which a plurality of plasmon coupling sections 21 are arranged.

Optical connection mechanism 49 has spacers 44 that form a space between substrate 46 and light conductor 42; connection portions 45 secured to substrate 46, and a pair of transparent electrodes 43 and 47 that move connection portions 45. Optical connection mechanism 49 is, for example, a so-called TMOS (Time Multiplexed Optical Shutter).

Connection portions 45 are arranged below plasmon coupling section 21 such that transparent electrode 47 and substrate 46 are sandwiched between connection portions 45 and plasmon coupling sections 21. Connection portions 45 have a two-dimensional periodic structure. Transparent electrode 43 is arranged on light conductor 42, whereas transparent electrode 47 is arranged on substrate 46. Transparent electrode 47 arranged corresponding to plasmon coupling sections 21 is integrally formed on substrate 46. Plasmon coupling sections 21 according to this embodiment are arranged on transparent electrode 47 formed on substrate 46.

In optical connection mechanism 49, when a voltage is applied between the pair of transparent electrodes 43 and 47, electrostatic force occurs therebetween and thereby transparent electrode 47 and substrate 46 are deformed. When transparent electrode 47 and substrate 46 are deformed, connection portions 45 move between a first position at which light emitted from light emitting element 25 passes through substrate 46 and a second position at which Light emitted from light emitting element 25 does not pass through substrate 46. When connection portions 45 move to the first position, they makes contact with transparent electrode 43. Thus, desired plasmon coupling section 21 arranged on substrate 46 is optically connected to light conductor 42.

In display element 4 according to the fourth embodiment, the effective dielectric constant of the incident side portion including the entire structure stacked on carrier generation layer 32 side of plasmon excitation layer 19, transparent electrode 47, and substrate 16 is set to be higher than the effective dielectric constant of the exit side portion including the entire structure stacked on wave number vector conversion layer 33 side of plasmon excitation layer 19 and the medium that makes contact with wave number vector conversion layer 33.

Display element 4 according to the fourth embodiment uses surface plasmons in the same manner as the second embodiment and obtains the same effect as the foregoing embodiments. Thus, the fourth embodiment can realize a display element having high luminance and high directivity.

The plasmon coupling sections of display element 4 according to the fourth embodiment may be plasmon coupling sections according to the first to third embodiments.

(Fifth Embodiment)

Figure 11:
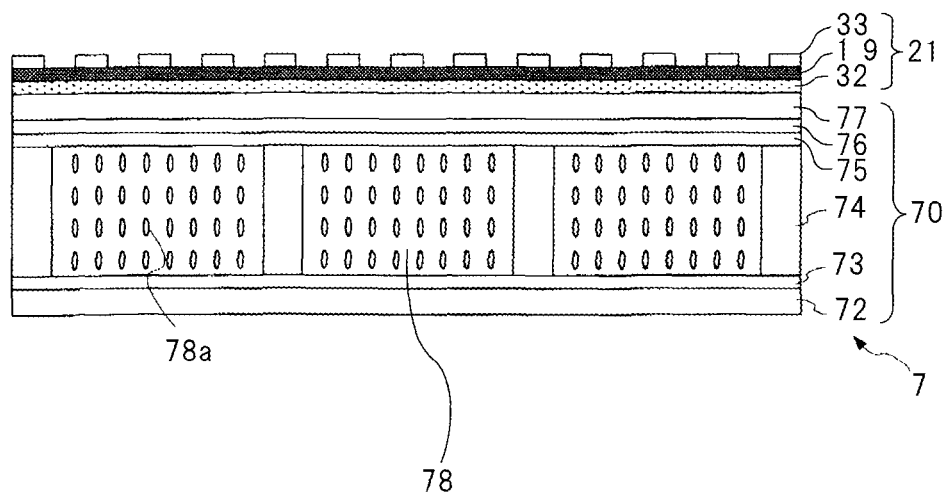
FIG. 11 is a sectional view schematically showing a display element according to a fifth embodiment.

FIG. 11 is a sectional view schematically showing a display element according to a fifth embodiment of the present invention. The display element according to the fifth embodiment is different from those according to the other embodiments in that a liquid crystal panel is used as a light valve section and that liquid crystal molecules contained in the liquid crystal panel are used as a plurality of optical shutter means. Plasmon coupling sections according to the fifth embodiment are the same as plasmon coupling sections 21 according to the second embodiment and thereby their description will be omitted.

As shown in FIG. 11, light valve section 70 of display element 7 according to the fifth embodiment is composed of a liquid crystal panel that has a pair of glass substrates 72 and 77 on which alignment films 73 and 76 are formed respectively; liquid crystal layer 78 sandwiched between glass substrates 72 and 77 through alignment films 73 and 76, respectively; and spacers 74 arranged between glass substrates 72 and 77. Liquid crystal layer 78 has liquid crystal molecules 78a arranged corresponding to pixels that comprise plasmon coupling sections 21. In liquid crystal layer 78, a plurality of pixels composed of liquid crystal molecules 78a surrounded by spacers 74 are arranged in a matrix shape. It is preferable that spacers 74 be made of a material that is transparent to visible light.

According to this embodiment, since a liquid crystal panel is used as light valve section 70, polarizer layer 76 that polarizes light that is transmitted through the liquid crystal panel is sandwiched between glass substrate 77 that comprises the liquid crystal panel and alignment film 75. In addition, according to this embodiment, a plurality of plasmon coupling sections 21 corresponding to a plurality of pixels are integrally formed together on glass substrate 77. In addition, a light emitting element (not shown) is arranged on the incident side of the liquid crystal panel.

In display element 7 according to the fifth embodiment, the effective dielectric constant of the incident side portion including display element 7 and carrier generation layer 32 with respect to plasmon excitation layer 19 is higher than the effective dielectric constant of the exit side portion including wave number vector conversion layer 33 and the medium with respect to plasmon excitation layer 19.

Since display element 7 according to the fifth embodiment having the foregoing structure uses a relatively inexpensive liquid crystal panel for light valve section 70, the manufacturing cost of the display element can be reduced. In addition, the fifth embodiment can obtain the same effect as the foregoing embodiments and realize a display element having high luminance and high directivity.

The plasmon coupling sections according to the fifth embodiment may be plasmon coupling sections 11, 21, or 31 according to the first to third embodiments. If necessary, light valve section 70 including a liquid crystal panel may be arranged on the exit side of the plasmon coupling sections.

In the foregoing embodiments, when the plasmon coupling sections are arranged on the exit side of transmission type light valve section (not shown) through which light of the light emitting element is transmitted, any one type of plasmon coupling sections according to the first to third embodiments may be used.

EXAMPLE 1

Figure 12:
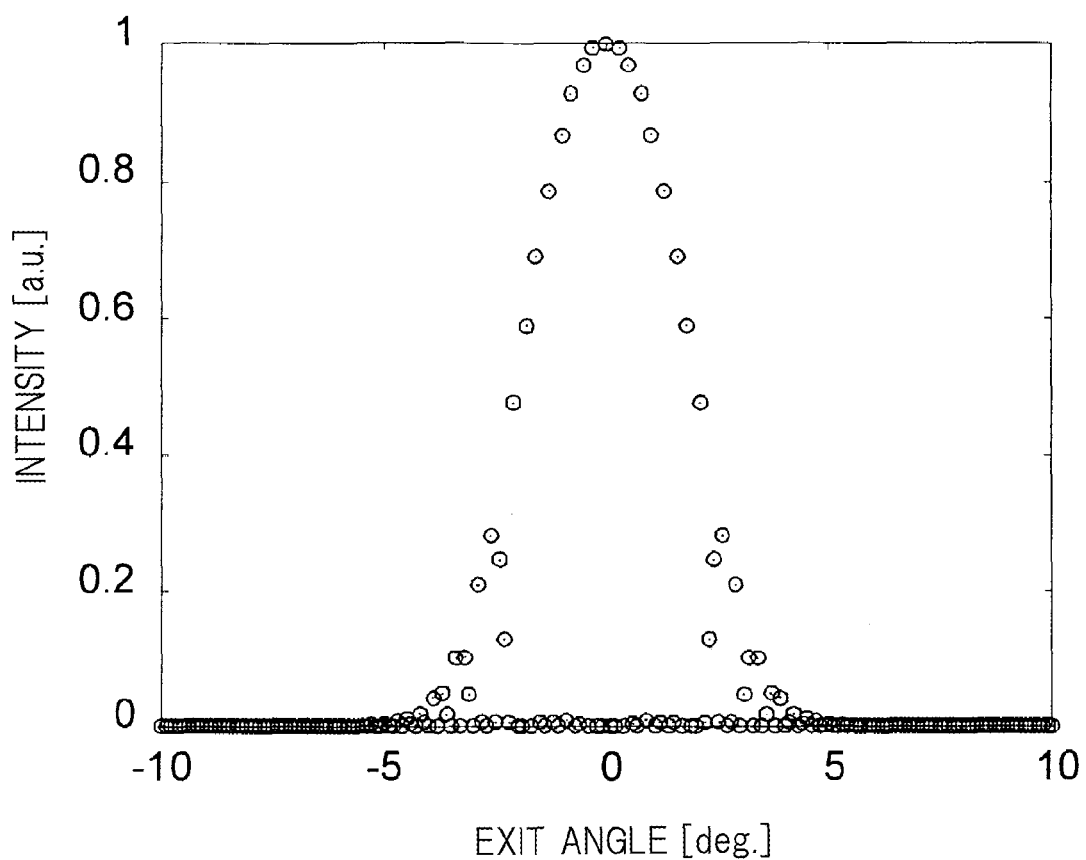
FIG. 12 is a schematic diagram showing an angle distribution of light emitted from the display element according to the first embodiment.

FIG. 12 shows an angle distribution of light that exits display element 1 according to the first embodiment. In FIG. 12, the horizontal axis represents the exit angle of light that exits display element 1, whereas the vertical axis represents the intensity thereof.

Substrate 16 made of $SiO_2$, carrier generation layer 17 made of a fluorescent substance containing PVA (polyvinyl alcohol) as a primary component, first dielectric constant layer 18 made of porous $SiO_2$, plasmon excitation layer 19 made of Ag, second dielectric constant layer 22 made of $TiO_2$, and wave number vector conversion layer 23 made of $TiO_2$ were prepared such that their thicknesses became 0.5 mm, 70 nm, 10 nm, 50 nm, 10 μm, and 950 nm, respectively. The wave length of light emitted from carrier generation layer 17 was 460 nm. The pitch and duty ratio of the periodic structure of wave number vector conversion layer 23 were set to 280 nm and 0.5, respectively. The dielectric constant of porous $SiO_2$ was 1.12.

For simplicity, calculations were performed in two dimensions. When the full width of an angle at which the intensity of light emitted from light emitting element 2 is halved is defined as an emission angle, the emission angel of light having a wavelength of 460 nm was ±2.0 (deg). Although FIG. 12 shows points whose intensity is nearly "0" at exit angles of ±5 (deg), they occur because of calculation accuracies. Thus, in reality, a luminous intensity distribution that represents a curve connecting points shown in FIG. 12 is obtained. When the pitch of the periodic structure is changed from 280 nm, a luminous intensity distribution having two separated peaks is obtained.

Thus, in the display element according to this embodiment, when the directivity of the emission angle of light emitted from the display element is improved and the grating structure of wave number vector conversion layer 23 is adequately adjusted, the emission angle can be narrowed within ±5 degrees so as to further improve the directivity.

EXAMPLE 2

Figure 13:
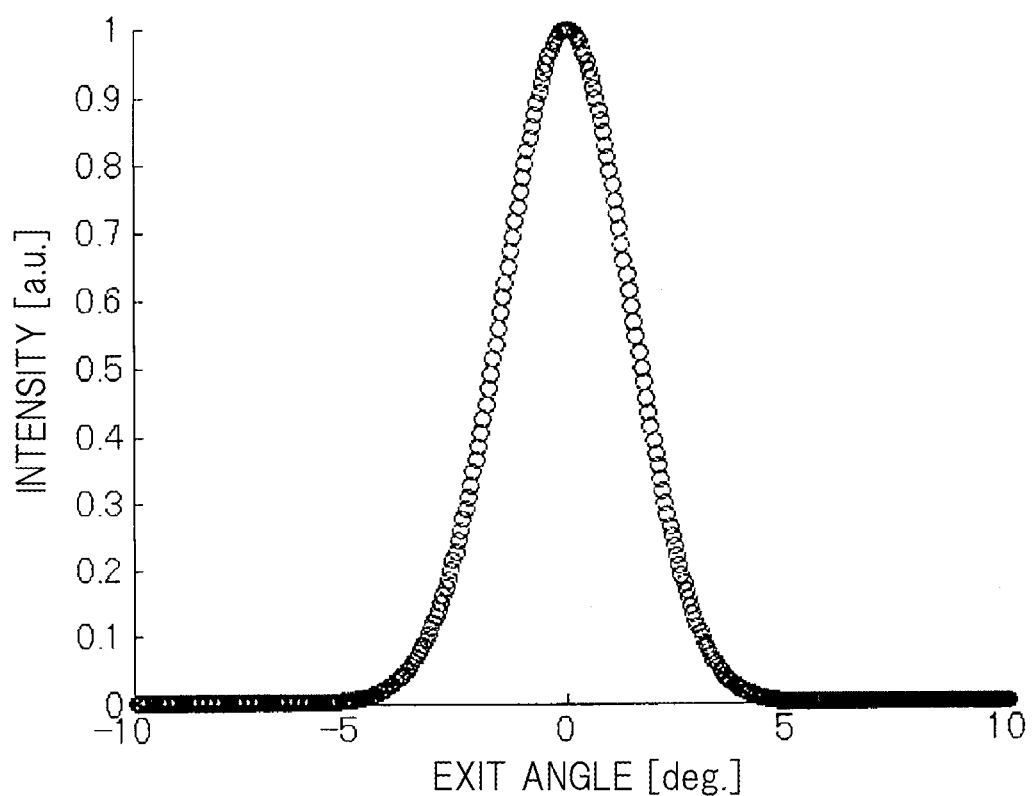
FIG. 13 is a schematic diagram showing an angle distribution of light emitted from the display element according to the second embodiment.

FIG. 13 shows an angle distribution of light emitted from display element 2 according to the second embodiment. In this example, calculations for the structure in which first dielectric constant layer 18 and second dielectric constant layer 22 were arranged in plasmon coupling sections 11 were performed. In FIG. 13, the horizontal axis represents the exit angle of light that exits display element 2, whereas the vertical axis represents the intensity thereof.

Substrate 16 made of $SiO_2$, carrier excitation layer 17 made of a fluorescent substance containing PVA as a primary component, first dielectric constant layer 18 made of porous $SiO_2$, plasmon excitation layer 19 made of Ag, second dielectric constant layer 22 made of $Al_2O_3$, and wave number vector conversion layer 23 made of PMMA (polymethyl methacrylate) were prepared such that their thicknesses became 0.5 mm, 100 nm, 10 nm, 50 nm, 10 nm, and 100 nm, respectively. The dielectric constant of porous $SiO_2$ was 1.12. The depth, pitch, and duty ratio of the periodic structure of wave number vector conversion layer 23 were set to 100 nm, 421 nm, and 0.5, respectively. Although the light that is emitted under this condition had a luminous intensity distribution similar to a Gaussian function rather than a ring shape, when the pitch was changed from 321 nm, the peak was split and thereby a ring-shaped luminous intensity distribution was obtained. The luminous intensity distribution of Example 2 in which plasmon excitation layer 19 is sandwiched between first dielectric constant layer 18 and second dielectric constant layer 22 was higher than that of Example 1.

In Example 2, the effective dielectric constants of the exit side portion and incident side portion of plasmon excitation layer 19 became 1.48 and 2.52, respectively, from Formula (1). The imaginary parts of the wave numbers in the z direction of the exit side and the incident side of surface plasmons became $8.96 \times 10^6$ and $1.71 \times 10^7$, respectively, from Formula (2). Assuming that the effective interaction distance of surface plasmons is the distance in which the intensity of surface plasmons becomes $e^{-2}$, because of $1/\text{Im}(k_{spp,z})$, the effective interaction distances of surface plasmons on the exit side and incident side become 112 nm and 58 nm, respectively.

The display element according to this embodiment can be suitably used for a display element of an image display device. In addition, the display element according to this embodiment may be used for a display element of a projection display device, a display element of an electronic device such as a mobile phone or a PDA (Personal Data Assistant), or a display device.

Figure 14:
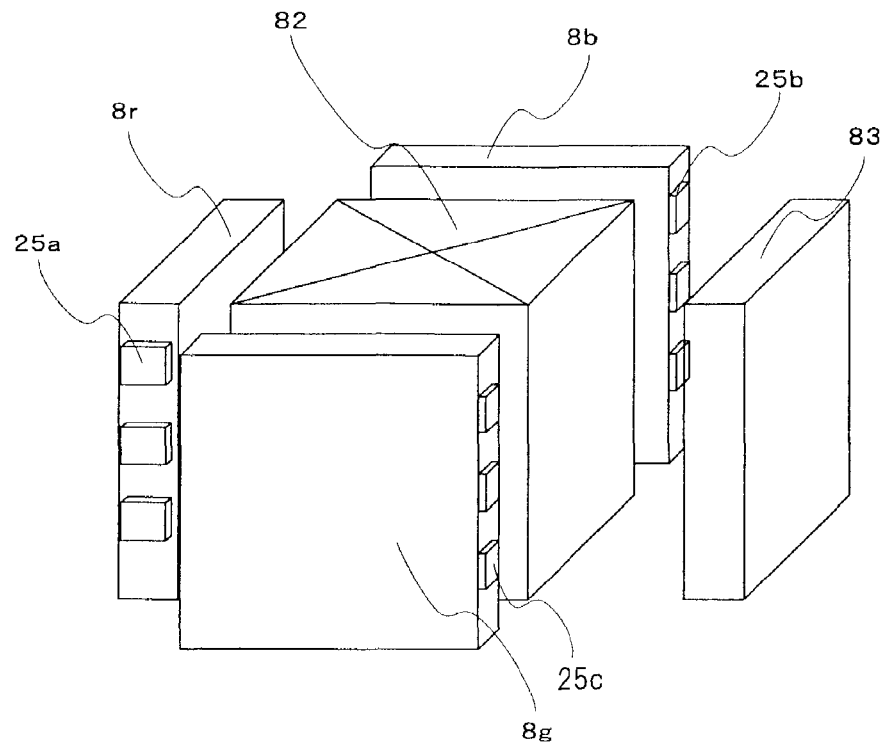
FIG. 14 is a perspective view schematically showing a projector having solid state light source according to an embodiment of the present invention, a display element according to an embodiment of the present invention being applied to the projector.

Finally, with reference to an accompanying drawing, an example of a structure of a projector having solid state light source as a projection display device to which a display element according to each of the foregoing first to fifth embodiments is applied will be described. FIG. 14 is a perspective view schematically showing a projector having solid state light source according to an embodiment of the present invention.

As shown in FIG. 14, the projector having solid state light source according to an embodiment of the present invention has a plurality of light emitting elements 25a, 25b, and 25c, red (R) display element 8r, green display element 8g, and blue display element 8b into which light of light emitting elements 25a, 25b, and 25c enters. In addition, the projector having solid state light source has cross dichroic prism 82 that combines R, G, and B lights modulated by display elements 8r, 8g, and 8h; and projection optical system 83 including a projection lens (not shown) that projects light that exits projection optical system 83 on a projection plane such as a screen. This projector having solid state light source has the structure of a three-panel type projector.

Figure 15:
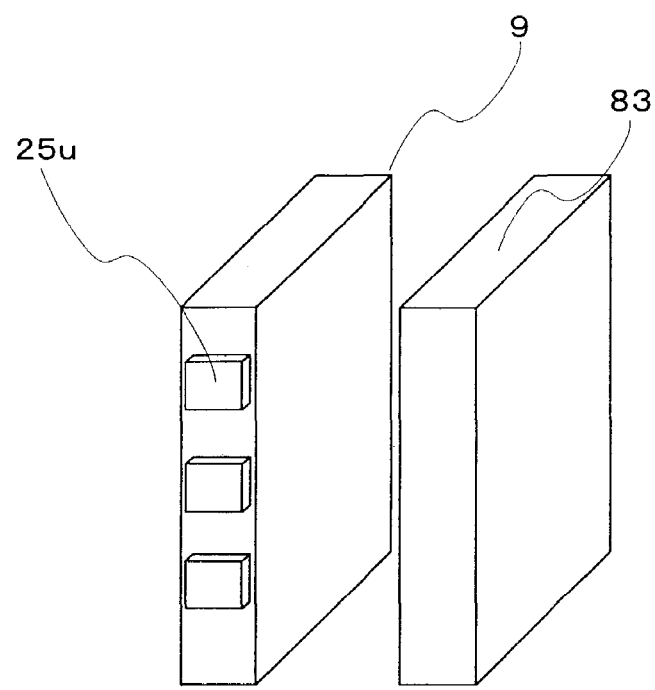
FIG. 15 is a perspective view schematically showing a projector having solid state light source according to another embodiment of the present invention, a display element according to an embodiment of the present invention being applied to the projector.

The display element according to each embodiment of the present invention can be applied to a single-panel type projector shown in FIG. 15. FIG. 15 is a perspective view schematically showing a projector having solid state light source according to another embodiment of the present invention.

As shown in FIG. 15, the projector having a solid state light source according to another embodiment has a plurality of light emitting elements 25u; display element 9 into which light emitted from light emitting elements 25u enters; and projection optical system 83 that includes a projection lens (not shown) that projects light emitted from display element 9 on a projection plane such as a screen. Plasmon coupling sections (not shown) of display element 9 have carrier generation layers (not shown) made of materials that are different from each pixel which corresponds to R, G, and B.

When a display element according to an embodiment of the present invention is applied to the projectors having a solid state light source according to embodiments shown in FIG. 14 and FIG. 15, the luminance of projection images can be improved.

With reference to the embodiments, the present invention has been described. However, it should be understood by those skilled in the art that the structure and details of the present invention may be changed in various manners without departing from the scope of the present invention.

The present application claims a priority based on Japanese Patent Application JP 2010-112073 filed on May 14, 2010, the entire contents of which are incorporated herein by reference in its entirety.

REFERENCE NUMERALS

1 Display element
10 Light valve section
11 Plasmon coupling sections
14 Shutter mechanism
16 Substrate
17 Carrier generation layer
18 First dielectric constant layer
19 Plasmon excitation layer
22 Second dielectric constant layer
23 Wave number vector conversion layer
25 Light emitting element

The invention claimed is:

1. A display element, comprising:
a light valve section having a plurality of optical shutter means that switch between a transmitting state and a shading state of light emitted from a light emitting element; and a substrate through which light that exits said plurality of optical shutter means is transmitted; and
a plasmon coupling section that is arranged on said substrate and that causes plasmon coupling to occur with light that exits said light valve section,
wherein said plasmon coupling section includes:
a carrier generation layer that generates carriers with incident light that exits said light valve section,
a plasmon excitation layer that is stacked above said carrier generation layer and that has a higher plasma frequency than the frequency of light that is generated in said carrier generation layer excited with the light emitted from said light emitting element, and
an exit layer that is stacked above said plasmon excitation layer and that converts the light or surface plasmons generated in said plasmon excitation layer into light having a predetermined exit angle, and
wherein said plasmon excitation layer is sandwiched between two layers having dielectric constants.

2. The display element according to claim 1, further comprising:
a dielectric constant layer arranged adjacent to either or both of said exit layer side of said plasmon excitation layer and said carrier generation layer side of said plasmon excitation layer.

3. The display element according to claim 2,
wherein said plasmon excitation layer is sandwiched between a pair of said dielectric constant layers, and
wherein said dielectric constant layer adjacent to said carrier generation layer side of said plasmon excitation layer has a lower dielectric constant than said dielectric constant layer adjacent to said exit layer side of said plasmon excitation layer.

4. The display element according to claim 1,
wherein the effective dielectric constant of an incident side portion including an entire structure stacked above said carrier generation layer side of said plasmon excitation layer of said plasmon coupling section and said substrate is lower than that of an exit side portion including an entire structure stacked above said exit layer side of said plasmon excitation layer and a medium that makes contact with said exit layer.

5. The display element according to claim 2,
wherein said plasmon excitation layer is sandwiched between a pair of said dielectric constant layers, and
wherein said dielectric constant layer adjacent to said carrier generation layer side of said plasmon excitation layer has a higher dielectric constant than said dielectric constant layer adjacent to said exit layer side of said plasmon excitation layer.

6. The display element according to claim 1,
wherein the effective dielectric constant of the incident side portion including the entire structure stacked above said carrier generation layer side of said plasmon excitation layer of said plasmon coupling section and said substrate is higher than that of the exit side portion including the entire structure stacked above said exit layer side of said plasmon excitation layer and a medium that makes contact with said exit layer.

7. The display element according to claim 4,
wherein said effective dielectric constant is determined based on a dielectric constant distribution of dielectrics in the incident side portion or the exit side portion and based on a distribution of a surface plasmon in the direction vertical to the interface of the plasmon excitation layer in the incident side portion or the exit side portion.

8. The display element according to claim 1,
wherein said light valve section has a light conductor into which light emitted from said light emitting element enters, and
wherein said light conductor has a transmitting region through which light emitted from said light emitting element enters said plasmon coupling section.

9. The display element according to claim 8,
wherein said plasmon coupling section is arranged opposite to said transmitting region.

10. The display element according to claim 1,
wherein each of said plurality of optical shutter means includes:

a shutter member that switches between an open state and a close state for the transmitting region through which light emitted from said light emitting element passes, and a drive mechanism that drives said shutter member.

11. The display element according to claim 1, wherein each of said plurality of optical shutter means includes:

a connection section secured to said substrate, and a pair of electrodes that move said connection section to a first position at which light emitted from said light emitting element passes through said substrate and a second position at which light emitted from said light emitting element does not pass through said substrate.

12. The display element according to claim 1, wherein said light valve section has a liquid crystal panel including said substrate, and wherein each of said plurality of optical shutter means is made of liquid crystal molecules that comprise said liquid crystal panel.

13. The display element according to claim 1, wherein said exit layer is made of photonic crystal.

14. The display element according to claim 1, wherein said plasmon excitation layer that comprises red pixels, green pixels, and blue pixels, the red pixels being made of Au or an alloy containing Au as a primary component, the green pixels being made of Au, Ag, or an alloy containing Au or Ag as a primary component, the blue pixels being made of Ag or an alloy containing Ag as a primary component.

15. A display device, comprising:

a display element according to claim 1; and at least one light emitting element.

16. A projection display device, comprising:

a display device according to claim 15; and a projection optical system that projects a projection image with light that exits said display device.

\* \* \* \* \*